US009792710B2

(12) United States Patent
Kimura

(10) Patent No.: US 9,792,710 B2
(45) Date of Patent: Oct. 17, 2017

(54) DISPLAY DEVICE, AND METHOD OF CONTROLLING DISPLAY DEVICE

(71) Applicant: Seiko Epson Corporation, Tokyo (JP)

(72) Inventor: Fusashi Kimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 19 days.

(21) Appl. No.: 14/971,391

(22) Filed: Dec. 16, 2015

(65) Prior Publication Data

US 2016/0187653 A1    Jun. 30, 2016

(30) Foreign Application Priority Data

Dec. 25, 2014  (JP) ................. 2014-261728

(51) Int. Cl.
| | | |
|---|---|---|
| G09G 5/00 | (2006.01) | |
| G06T 11/60 | (2006.01) | |
| G02B 27/01 | (2006.01) | |

(52) U.S. Cl.
CPC .......... *G06T 11/60* (2013.01); *G02B 27/017* (2013.01); *G02B 2027/014* (2013.01); *G02B 2027/0138* (2013.01)

(58) Field of Classification Search
CPC .............. G02B 27/01; G02B 27/017; G02B 2027/0138; G02B 2027/014; G06K 9/46; H04N 7/144
See application file for complete search history.

(56) References Cited

U.S. PATENT DOCUMENTS

| | | | | |
|---|---|---|---|---|
| 6,637,883 B1* | 10/2003 | Tengshe | ................ | A61B 3/113 351/210 |
| 6,972,734 B1* | 12/2005 | Ohshima | ................ | A63F 13/10 345/157 |
| 2010/0284568 A1 | 11/2010 | Tojo | | |
| 2012/0127062 A1* | 5/2012 | Bar-Zeev | ................ | G02B 3/14 345/6 |
| 2013/0222215 A1* | 8/2013 | Kobayashi | ........... | G02B 27/017 345/8 |
| 2014/0063055 A1* | 3/2014 | Osterhout | ............... | G06F 3/005 345/633 |
| 2014/0168266 A1* | 6/2014 | Kimura | .............. | G02B 27/0172 345/633 |
| 2014/0225812 A1* | 8/2014 | Hosoya | ................ | G02B 27/017 345/8 |
| 2015/0084857 A1* | 3/2015 | Kimura | ..................... | G06F 3/03 345/156 |
| 2016/0033770 A1* | 2/2016 | Fujimaki | ............... | G06T 19/006 345/8 |

(Continued)

FOREIGN PATENT DOCUMENTS

| | | | |
|---|---|---|---|
| JP | 2010-263581 A | 11/2010 | |
| JP | 5398341 B | 1/2014 | |

*Primary Examiner* — Joe H Cheng
(74) *Attorney, Agent, or Firm* — ALG Intellectual Property, LLC

(57) ABSTRACT

A display device includes an image display section adapted to display an image so as to be able to be visually recognized together with an outside view, a camera, and a control section adapted to process taken image data of the camera, and the control section selects a mode as a processing condition, which corresponds to whether or not display is performed in the image display section based on taken image data, to process the taken image data.

9 Claims, 6 Drawing Sheets

(56) References Cited

U.S. PATENT DOCUMENTS

| | | | |
|---|---|---|---|
| 2016/0188277 A1* | 6/2016 | Miyasaka | G06F 3/1438 345/2.2 |
| 2016/0189364 A1* | 6/2016 | Aruga | G06F 3/011 345/8 |
| 2017/0010662 A1* | 1/2017 | Nishizawa | G06F 3/011 |
| 2017/0011555 A1* | 1/2017 | Li | G06T 7/004 |

\* cited by examiner

| MODE NAME | RESOLUTION | FRAME RATE | MARKER RECOGNITION |
|---|---|---|---|
| MODE 1 (LOW RESOLUTION MODE) | LOW | HIGH RATE | NO |
| MODE 2 (HIGH RESOLUTION MODE) | HIGH | LOW RATE | NO |
| MODE 3 (LOW RESOLUTION MARKER RECOGNITION MODE) | LOW | LOW RATE | YES |
| MODE 4 (HIGH RESOLUTION MARKER RECOGNITION MODE) | HIGH | HIGH RATE | YES |

FIG. 4A

| MODE NAME | RESOLUTION / FRAME RATE | MARKER RECOGNITION |
|---|---|---|
| MODE 5 (INTERMITTENT HIGH RESOLUTION MODE) | INTERMITTENTLY SWITCHING BETWEEN MODE 1 AND MODE 2 | NO |
| MODE 6 (INTERMITTENT HIGH RESOLUTION MODE) | INTERMITTENTLY SWITCHING BETWEEN MODE 3 AND MODE 4 | YES |

FIG. 4B

| MODE NAME | RESOLUTION | FRAME RATE | MARKER RECOGNITION |
|---|---|---|---|
| MODE 10 (TAKEN IMAGE DISPLAY MODE) | LOW | LOW RATE | NO |

FIG. 4C

DISPLAY DEVICE, AND METHOD OF CONTROLLING DISPLAY DEVICE

BACKGROUND

1. Technical Field

The present invention relates to a display device and a method of controlling the display device.

2. Related Art

In the past, there has been known a device provided with an imaging device and adapted to recognize an object from video data (see, e.g., Japanese Patent No. 5,398,341 (Document 1)). The device described in Document 1 recognizes the object using the video data having the highest resolution values and frame rate values among available resolution values and frame rate values in a camera as the imaging device, and then sets control parameters of the camera based on the result to thereby optimize the resolution and the frame rate.

The device described in Document 1 can reduce the load by optimizing the resolution, the frame rate, and so on, but needs to perform a recognition process high in load using the video data with the highest resolution for the optimization. Therefore, there is a possibility that the high load state continues depending on the frequency of the optimization.

SUMMARY

An advantage of some aspects of the invention is to suppress the processing load in a device using video data of a taken image.

A display device according to an aspect of the invention includes a display section adapted to display an image so as to be able to be visually recognized together with an outside view, an imaging section, and a processing section adapted to process taken image data of the imaging section, and the processing section processes the taken image data in accordance with processing condition corresponding to whether or not display of the taken image data is performed in the display section.

According to this aspect of the invention, since the processing condition can be optimized in accordance with whether or not the display is performed based on the taken image data without a high load process, the processing load can be suppressed.

According to another aspect of the invention, in the display device described above, the processing section processes the taken image data in accordance with the processing condition different by whether or not the taken image data is displayed in the display section.

According to this aspect of the invention, by making the processing condition different between the case of displaying the taken image data and the case of not displaying the taken image data, the taken image data can efficiently be processed in an appropriate condition.

According to another aspect of the invention, in the display device described above, the processing section processes the taken image data in accordance with the processing condition different by whether or not the taken image data is displayed in the display section.

According to this aspect of the invention, since the process is performed in the processing condition different between the case of displaying the taken image data in the display section and the case of not displaying the taken image data in the display section, the processing condition can be optimized so as to suppress the processing load in accordance with the needs of the process.

According to another aspect of the invention, in the display device described above, there is further provided with an imaging control section adapted to set an imaging condition of the imaging section to make the imaging section perform imaging in the imaging condition set, and the processing section makes the imaging control section set the imaging condition corresponding to the processing condition.

According to this aspect of the invention, it is possible to appropriately set the imaging condition of the imaging section to thereby suppress the processing load.

According to another aspect of the invention, in the display device described above, the imaging section and the processing section are connected to each other with a bus, and the imaging section transmits the taken image data, which is suitable for the imaging condition set by the imaging control section, to the processing section via the bus.

According to this aspect of the invention, since the data suitable for the imaging condition thus set is used as the taken image data to be transmitted, the processing load related to the data transmission can be reduced.

According to another aspect of the invention, in the display device described above, the imaging section is configured so as to take a moving image to output the taken image data, and is capable of performing the operation while switching between the operation modes related to at least either of a resolution and a frame rate of the taken image data, and the imaging control section sets the operation mode in which the imaging section performs the operation.

According to this aspect of the invention, by switching the operation mode of the imaging section, the condition can easily be changed, and it is possible to set the necessary and sufficient processing condition to thereby suppress the processing load.

According to another aspect of the invention, in the display device described above, the processing section is capable of changing an execution state of the process, the imaging section is capable of performing an operation while switching between operation modes corresponding to the execution state of the process of the processing section, and the imaging control section sets the operation mode, which corresponds to the execution state of the process of the processing section, to the imaging section.

According to this aspect of the invention, since the operation mode of the imaging section is switched in accordance with the execution state of the process with respect to the taken image data, it is possible to make the imaging section perform the operation in an appropriate condition to thereby efficiently perform imaging and the process.

According to another aspect of the invention, in the display device described above, the operation mode of the imaging section includes operation modes corresponding to whether or not the processing section performs marker recognition using the taken image data.

According to this aspect of the invention, by appropriately setting the condition of the process in accordance with whether or not the marker recognition is performed, the processing load can be suppressed.

According to another aspect of the invention, in the display device described above, the processing condition in a case of performing display based on the taken image data with the display section includes a condition of setting a capacity of the taken image data input to the processing section smaller than in the case of not being accompanied by display based on the taken image data with the display section.

According to this aspect of the invention, by decreasing the capacity of the taken image data to be processed, the processing load can efficiently be suppressed.

According to another aspect of the invention, in the display device described above, an imaging range of the imaging section is a range corresponding to the outside view to be visually recognized through the display section.

According to this aspect of the invention, an appropriate processing condition can be set even in the case of performing display so as to be visually recognized together with the outside view based on the taken image data, or in the case in which there is no need to make the display section perform display.

According to another aspect of the invention, in the display device described above, there is further provided with a battery, and power is supplied from the battery to at least the imaging section and the processing section.

According to this aspect of the invention, by reducing the load of the imaging section and the processing section, the power consumption can be suppressed, and battery consumption can be suppressed.

A method of controlling a display device according to another aspect of the invention includes controlling a display device having a display section adapted to display an image so as to be able to be visually recognized together with an outside view, and an imaging section, and processing taken image data in accordance with processing condition corresponding to whether or not display of the taken image data is performed in the display section.

According to this aspect of the invention, since the processing condition can be optimized without a high load process, the processing load can be suppressed.

BRIEF DESCRIPTION OF THE DRAWINGS

The invention will be described with reference to the accompanying drawings, wherein like numbers reference like elements.

FIGS. 4A through 4C are diagrams showing a configuration example of imaging condition tables.

DESCRIPTION OF AN EXEMPLARY EMBODIMENT

Figure 1:
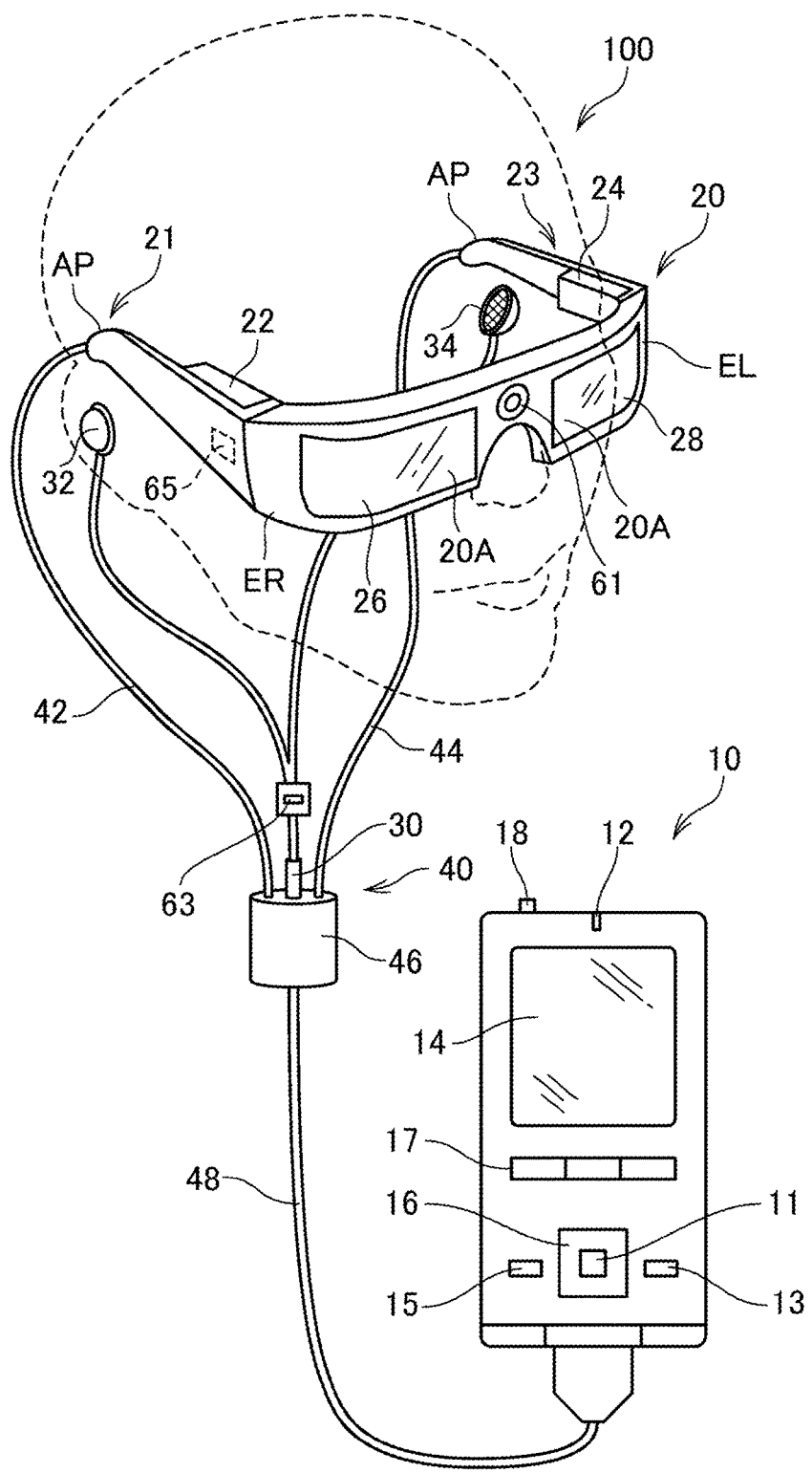
FIG. 1 is an explanatory diagram showing an exterior configuration of a head-mounted display device.

FIG. 1 is a diagram showing an exterior configuration of a head-mounted display device 100 (a display device) according to an embodiment to which the invention is applied.

The head-mounted display device 100 is provided with an image display section 20 for making the user visually recognize a virtual image in the state of being mounted on the head of the user, and a control section 10 for controlling the image display section 20. The control device 10 also functions as a controller for the user to operate the head-mounted display device 100.

The image display section 20 is a mounted body to be mounted on the head of the user, and is shaped like a pair of glasses in the present embodiment. The image display section 20 is provided with a right holding section 21, a right display drive section 22 (a light emitting section), a left holding section 23, a left display drive section 24 (a light emitting section), a right optical image display section 26, a left optical image display section 28, a camera 61 (an imaging section), and a microphone 63. The right optical image display section 26 and the left optical image display section 28 are disposed so as to be located in front of the right and left eyes of the user, respectively, when the user wears the image display section 20. One end of the right optical image display section 26 and one end of the left optical image display section 28 are connected to each other at a position corresponding to the glabella of the user when the user wears the image display section 20.

The right holding section 21 is a member disposed so as to extend from an end portion ER, which is the other end of the right optical image display section 26, to a position corresponding to a temporal region of the user when the user wears the image display section 20. Similarly, the left holding section 23 is a member disposed so as to extend from an end portion EL, which is the other end of the left optical image display section 28, to a position corresponding to a temporal region of the user when the user wears the image display section 20. The right holding section 21 and the left holding section 23 hold the image display section 20 on the head of the user in such a manner as the temples of the pair of glasses.

The right display drive section 22 and the left display drive section 24 are disposed on the respective sides to be opposed to the head of the user when the user wears the image display section 20. It should be noted that the right display drive section 22 and the left display drive section 24 are also collectively referred to simply as a "display drive section," and the right optical image display section 26 and the left optical image display section 28 are also collectively referred to simply as an "optical image display section."

The display drive sections 22, 24 respectively include liquid crystal displays 241, 242 (hereinafter referred to as "LCD 241, 242"), projection optical systems 251, 252, and so on.

The right optical image display section 26 and the left optical image display section 28 are respectively provided with light guide plates 261, 262 (FIG. 2) and dimming plates 20A. The light guide plates 261, 262 are each formed of light transmissive resin or the like, and guide the image light output from the display drive sections 22, 24 to the eyes of the user, respectively. Each of the dimming plates 20A is a thin-plate like optical element, and is disposed so as to cover the obverse side of the image display section 20, which is the opposite side to the side of the eyes of the user. As the dimming plates 20A, there are used a variety of members such as a member with little light permeability, a nearly transparent member, a member for transmitting light while reducing the light intensity, or a member for attenuating or reflecting the light with a specific wavelength. By appropriately selecting the optical characteristics (e.g., the light transmittance) of the dimming plates 20A, it is possible to control the intensity of the outside light externally entering the right optical image display section 26 and the left optical image display section 28 to thereby control easiness of the visual recognition of the virtual image. In the description of the present embodiment, there is explained the case of using the dimming plates 20A having at least such light transmittance that the user wearing the head-mounted display device 100 can visually recognize the outside scenery. The dimming plates 20A protect the right light guide plate 261 and the left light guide plate 262 to suppress damages, adhesion of dirt, and so on to the right light guide plate 261 and the left light guide plate 262, respectively.

The dimming plates 20A can be arranged to be detachably attached to the right optical image display section 26 and the left optical image display section 28, or it is possible to arrange that a plurality of types of dimming plates 20A can be attached while being replaced with each other, or it is also possible to eliminate the dimming plates 20A.

Further, the head-mounted display device 100 makes the image light to be processed inside and the outside light overlap each other and then enter the eyes of the user, and it is possible for the user to see the outside view through the dimming plates 20A, and to visually recognize the image due to the image light so as to be superimposed on the outside view. As described above, the head-mounted display device 100 functions as a see-through display device.

The camera 61 is disposed in a boundary portion between the right optical image display section 26 and the left optical image display section 28. In the state in which the user wears the image display section 20, the position of the camera 61 is roughly the middle of the both eyes of the user in a horizontal direction, and is above the both eyes of the user in the vertical direction. The camera 61 is a digital camera provided with an imaging element such as CCD or CMOS, an imaging lens, and so on, and can be a monocular camera or a stereo camera.

The camera 61 takes an image of at least a part of the outside view in the obverse side direction of the head-mounted display device 100, in other words, in the view field direction of the user in the state of wearing the head-mounted display device 100. Although the width of the field angle of the camera 61 can arbitrarily be set, it is preferable that the imaging range of the camera 61 corresponds to the range including the external sight visually recognized by the user through the right optical image display section 26 and the left optical image display section 28. Further, it is more preferable that the imaging range of the camera 61 is set so that the image of the entire view field of the user through the dimming plates 20A can be taken.

The camera 61 takes the image in accordance with the control by the control section 140 (FIG. 2), and then outputs the taken image data to the control section 140. The configuration of the camera 61 will be described later with reference to FIGS. 3A and 3B.

The image display section 20 is connected to the control device 10 via a connection section 40. The connection section 40 is provided with a main body cord 48 to be connected to the control device 10, a right cord 42, a left cord 44, and a coupling member 46. The main body cord 48 is branched into two cords to form the right cord 42 and the left cord 44. The right cord 42 is inserted into the housing of the right holding section 21 from a tip portion AP in the extending direction of the right holding section 21, and is connected to the right display drive section 22. Similarly, the left cord 44 is inserted into the housing of the left holding section 23 from a tip portion AP in the extending direction of the left holding section 23, and is connected to the left display drive section 24.

The coupling member 46 is disposed at a branch point of the main body cord 48, and the right cord 42 and the left cord 44, and has a jack to which an earphone plug 30 is connected. A right earphone 32 and a left earphone 34 extend from the earphone plug 30. A microphone 63 is disposed in the vicinity of the earphone plug 30. The wiring from the earphone plug 30 to the microphone 63 is bundled as a single cord, and the cord is branched at the microphone 63 to be connected respectively to the right earphone 32 and the left earphone 34.

Figure 2:
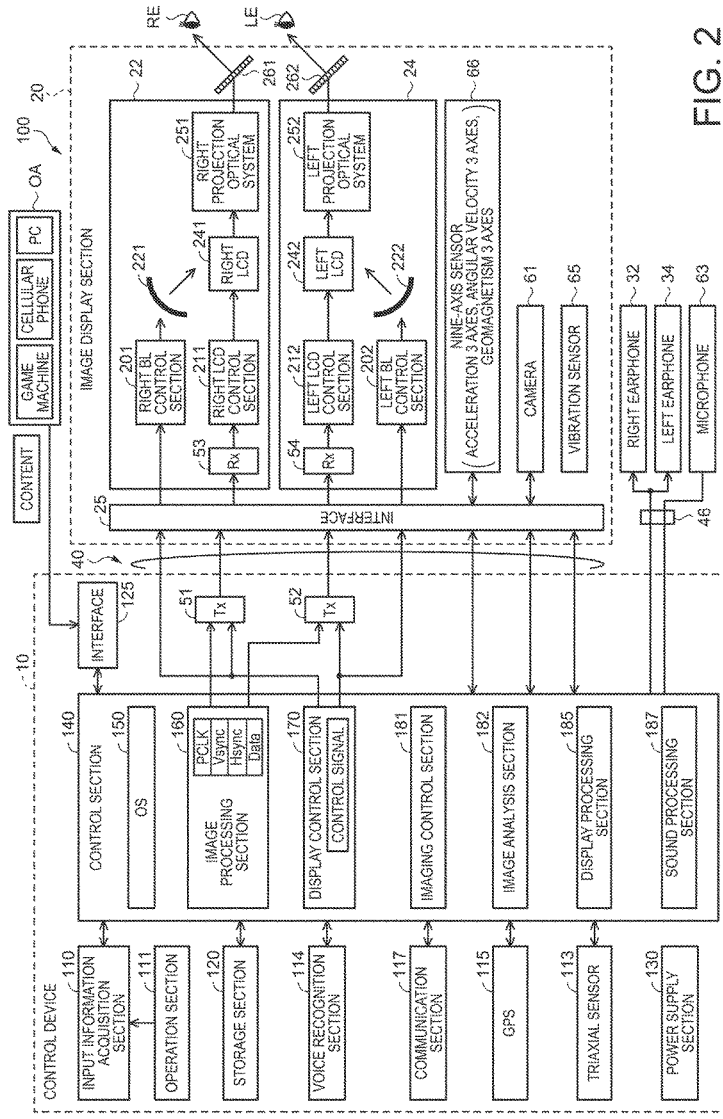
FIG. 2 is a functional block diagram of components constituting the head-mounted display device.

As shown in, for example, FIG. 1, the microphone 63 is disposed so that a sound collection section of the microphone 63 faces to the eye direction of the user, and collects the sound to output a sound signal to a sound processing section 187 (FIG. 2). The microphone 63 can be, for example, a monaural microphone or a stereo microphone, or can also be a directional microphone, or an omnidirectional microphone.

The right cord 42, the left cord 44, and the main body cord 48 are only required to be cords capable of transmitting digital data, and each can be formed of, for example, a metal cable or an optical fiber. Further, it is also possible to adopt a configuration of bundling the right cord 42 and the left cord 44 into a single cord.

The image display section 20 and the control device 10 transmit a variety of signals via the connection section 40. Conneters (not shown) to be fitted to each other are provided respectively to an end portion of the main body cord 48 on the opposite side to the coupling member 46, and the control device 10. By fitting the connector of the main body cord 48 and the connector of the control device 10 to each other, or releasing the fitting, it is possible to connect or disconnect the control device 10 and the image display section 20 to or from each other.

The control device 10 controls the head-mounted display device 100. The control device 10 is provided with switches including a determination key 11, a lighting section 12, a display switching key 13, a luminance switching key 15, arrow keys 16, a menu key 17, and a power switch 18. Further, the control device 10 is provided with a track pad 14 operated by the user with a hand and fingers.

The determination key 11 detects a holding-down operation, and then outputs a signal for determining the content of the operation in the control device 10. The lighting section 12 is provided with a light source such as a light emitting diode (LED) to make a notification of the operation state (e.g., an ON/OFF state of the power) of the head-mounted display device 100 using the lighting state of the light source. The display switching key 13 outputs, for example, a signal for instructing switching of the display mode of the image in accordance with a holding-down operation.

The track pad 14 has an operation surface for detecting a touch operation, and outputs an operation signal in accordance with the operation to the operation surface. The detection method in the operation surface is not particularly limited, but there can be adopted an electrostatic method, a pressure detection method, an optical method, and so on. The luminance switching key 15 outputs a signal for instructing to increase or decrease the luminance of the image display section 20 in accordance with a holding-down operation. The arrow keys 16 outputs an operation signal in accordance with a holding-down operation to the keys corresponding respectively to up, down, right, and left directions. The power switch 18 is a switch for switching between ON and OFF of the power of the head-mounted display device 100.

FIG. 2 is a functional block diagram of the constituents of the head-mounted display device 100.

The head-mounted display device 100 is provided with an interface 125 to which a variety of types of external equipment OA to be a supply source of the content are connected. As the interface 125, there can be used an interface compatible with wired connection such as a USB interface, a micro USB interface, or an interface for a memory card, and it is also possible for the interface 125 to be formed of a wireless communication interface. The external equipment OA is an image supply device for supplying the head-mounted display device 100 with an image, and there are used a personal computer (PC), a cellular phone unit, a portable game machine, and so on.

The control device 10 includes a control section 140, an input information acquisition section 110, a storage section 120, a transmitting section (Tx) 51, and a transmitting section (Tx) 52.

The input information acquisition section 110 is connected to an operation section 111. The operation section 111 includes the track pad 14, the arrow keys 16, the power switch 18, and so on described above, and the input information acquisition section 110 obtains the input content based on the signal input from the operation section 111. Further, the control device 10 is provided with a power supply section 130. The power supply section 130 is provided with a battery formed of a primary cell, or a secondary cell such as a lithium-ion battery, a lithium-polymer battery, or a nickel-metal hydride battery, and supplies each of the sections of the head-mounted display device 100 with power using the power stored in the battery.

The storage section 120 is a nonvolatile storage device, and stores a variety of computer programs, and data related to these programs. Further, it is also possible for the storage section 120 to store data of a still image and a moving image to be displayed on the image display section 20.

To the control section 140, there are connected a triaxial sensor 113, a GPS 115, a communication section 117, and a voice recognition section 114. The triaxial sensor 113 is a triaxial acceleration sensor, and the control section 140 obtains detection values of the triaxial sensor 113. The GPS 115 is provided with an antenna (not shown), and receives a GPS (Global Positioning System) signal to calculate the present position of the control device 10. The GPS 115 outputs the present position and the current time, which have been obtained based on the GPS signal, to the control section 140. Further, it is also possible for the GPS 115 to be provided with a function of obtaining the current time based on the information included in the GPS signal to correct the time kept by the control section 140.

The communication section 117 performs wireless data communication compliant with a standard such as the wireless LAN (WiFi (registered trademark)), Miracast (registered trademark), or Bluetooth (registered trademark).

In the case in which the external equipment OA is wirelessly connected to the communication section 117, the control section 140 obtains the content data from the communication section 117, and then makes the image display section 20 display the image. On the other hand, in the case in which the external equipment OA is connected to the interface 125 with wire, the control section 140 obtains the content data from the interface 125, and then makes the image display section 20 display the image. The communication section 117 and the interface 125 function as a data acquisition section DA for obtaining the content data from the external equipment OA.

The control section 140 is provided with a CPU (not shown) for executing the programs, a RAM (not shown) for temporarily storing the programs executed by the CPU and the data, and a ROM (not shown) for storing a basic control program executed by the CPU and data in a nonvolatile manner. The control section 140 retrieves and then executes the computer programs stored in the storage section 120 to thereby function as an operating system (OS) 150, an image processing section 160, a display control section 170, an imaging control section 181, an image analysis section 182 (a processing section), a display processing section 185, and the sound processing section 187.

The image processing section 160 obtains the image signal included in the content. The image processing section 160 separates the sync signals such as a vertical sync signal VSync and a horizontal sync signal HSync from the image signal thus obtained. Further, the image processing section 160 generates a clock signal PCLK using a phase locked loop (PLL) circuit or the like (not shown) in accordance with the periods of the vertical sync signal VSync and the horizontal sync signal HSync thus separated. The image processing section 160 converts the analog image signal, from which the sync signals are separated, into a digital image signal using an A/D conversion circuit or the like (not shown). The image processing section 160 stores the digital image signal obtained by the conversion into the RAM in the control section 140 frame by frame as the image data (Data in the drawing) of the target image. The image data is, for example, RGB data.

It should be noted that it is also possible for the image processing section 160 to perform a resolution conversion process for converting the resolution of the image data into the resolution suitable for the right display drive section 22 and the left display drive section 24 if necessary. Further, it is also possible for the image processing section 160 to perform an image adjustment process for adjusting the luminance and the chroma of the image data, a 2D/3D conversion process for generating 2D image data from 3D image data or generating 3D image data from 2D image data, and so on.

The image processing section 160 transmits each of the clock signal PCLK, the vertical sync signal VSync, the horizontal sync signal HSync, and the image data Data stored in the RAM via each of the transmitting sections 51, 52. The transmitting sections 51, 52 each function as a transceiver to perform serial transmission between the control device 10 and the image display section 20. It should be noted that the image data Data transmitted via the transmitting section 51 is referred to as "right-eye image data," and the image data Data transmitted via the transmitting section 52 is referred to as "left-eye image data."

The display control section 170 generates control signals for controlling the right display drive section 22 and the left display drive section 24, and controls generation and emission of the image light by each of the right display drive section 22 and the left display drive section 24 using the control signals. Specifically, the display control section 170 controls ON/OFF of the drive of the right LCD 241 by the right LCD control section 211 and ON/OFF of the drive of the right backlight 221 by the right backlight control section 201. Further, the display control section 170 controls ON/OFF of the drive of the left LCD 242 by the left LCD control section 212 and ON/OFF of the drive of the left backlight 222 by the left backlight control section 202.

The imaging control section 181 controls the camera 61 to perform imaging to thereby obtain the taken image data output by the camera 61. The imaging control section 181 makes the camera 61 perform imaging in accordance with imaging conditions set in advance.

The image analysis section 182 analyzes the taken image data output by the camera 61 to perform detection and recognition of a marker set in advance, detection of an image of a human or an object, and so on.

The display processing section 185 performs a process based on the processing result of the image analysis section 182. In the case in which, for example, the image analysis section 182 performs the recognition of the marker, the display processing section 185 performs a process of converting the marker into text data, a process of making the image display section 20 display the image corresponding to the data of the marker, and so on based on the recognition result of the image analysis section 182. Further, it is also possible for the display processing section 185 to perform a process of making the image display section 20 display the taken image data of the camera 61.

Further, the display processing section 185 selects an operation mode of the head-mounted display device 100 in accordance with the operation of the operation section 111. In the present embodiment, the operation mode corresponding to the resolution of the taken image data of the camera 61, the frame rate of the taken image data of the camera 61, and whether or not the recognition of the marker is performed by the image analysis section 182 can be switched and then performed. The marker which can be detected and recognized by the image analysis section 182 is a one-dimensional code such as a barcode, a two-dimensional code such as a QR code (registered trademark), or other markers which can mechanically be recognized as an image.

The sound processing section 187 obtains a sound signal included in the content, amplifies the sound signal thus obtained, and then outputs the result to the right earphone 32 and the left earphone 34. Further, the sound processing section 187 obtains the sound collected by the microphone 63, and then converts the sound into digital sound data. It is also possible for the sound processing section 187 to perform a process set in advance on the digital sound data.

The image display section 20 is provided with an interface 25, the right display drive section 22, the left display drive section 24, the right light guide plate 261 as the right optical image display section 26, the left light guide plate 262 as the left optical image display section 28, the camera 61, a vibration sensor 65, and a nine-axis sensor 66.

The vibration sensor 65 is configured using an acceleration sensor, and is incorporated in the vicinity of the end portion ER of the right optical image display section 26 in the right holding section 21 as shown in, for example, FIG. 1. In the case in which the user performs an operation (a knock operation) of knocking the end portion ER, the vibration sensor 65 detects the vibration due to this operation, and then outputs the detection result to the control section 140. Due to the detection result of the vibration sensor 65, the control section 140 detects the knock operation by the user.

The nine-axis sensor 66 is a motion sensor for detecting accelerations (3 axes), angular velocities (3 axes), and geomagnetisms (3 axes). In the case in which the image display section 20 is mounted on the head of the user, it is possible for the control section 140 to detect the motion of the head of the user based on the detection values of the nine-axis sensor 66. For example, it is possible for the control section 140 to estimate the level of the tilt and the direction of the tilt of the image display section 20 based on the detection values of the nine-axis sensor 66.

The interface 25 is provided with a connector to which the right cord 42 and the left cord 44 are connected. The interface 25 outputs the clock signal PCLK, the vertical sync signal VSync, the horizontal sync signal HSync, and the image data Data transmitted from the transmitting sections 51, 52 to the corresponding receiving sections (Rx) 53, 54. Further, the interface 25 outputs the control signals, which are transmitted from the display control section 170, to the receiving sections 53, 54, the light backlight control section 201 or the left backlight control section 202 corresponding to the control signals.

Further, the interface 25 is an interface for connecting the camera 61, the vibration sensor 65, and the nine-axis sensor 66. The detection result of the vibration sensor 65, the detection result of the accelerations (three axes), and the angular velocities (three axes), and geomagnetisms (three axes) provided by the nine-axis sensor 66 are transmitted to the control section 140 via the interface 25.

The right display drive section 22 is provided with the receiving section (Rx) 53, the right backlight (BL) control section 201 and the right backlight (BL) 221 functioning as a light source, the right LCD control section 211 and the right LCD 241 functioning as a display element, and the right projection optical system 251. The right backlight control section 201 and the right backlight 221 function as the light source. The right LCD control section 211 and the right LCD 241 function as the display element.

The receiving section 53 functions as a receiver for serial transmission between the control device 10 and the image display section 20. The right backlight control section 201 drives the right backlight 221 based on the control signal input to the right backlight control section 201. The right backlight 221 is a light emitter such as an LED or electroluminescence (EL). The right LCD control section 211 drives the right LCD 241 based on the clock signal PCLK, the vertical sync signal VSync, the horizontal sync signal HSync, and the right-eye image data Data input via the receiving section 53. The right LCD 241 is a transmissive liquid crystal panel having a plurality of pixels arranged in a matrix.

The right projection optical system 251 is formed of a collimating lens for converting the image light emitted from the right LCD 241 into a light beam in a parallel state. The right light guide plate 261 as the right optical image display section 26 guides the image light, which has been output from the right projection optical system 251, to the right eye RE of the user while reflecting the image light along a predetermined light path.

The left display drive section 24 has substantially the same configuration as that of the right display drive section 22. The left display drive section 24 is provided with the receiving section (Rx) 54, the left backlight (BL) control section 202 and the left backlight (BL) 222 functioning as the light source, the left LCD control section 212 and the left LCD 242 functioning as the display element, and the left projection optical system 252. The left backlight control section 202 and the left backlight 222 function as the light source. The left LCD control section 212 and the left LCD 242 function as the display element. Further, the left projection optical system 252 is formed of a collimating lens for converting the image light emitted from the left LCD 242 into a light beam in a parallel state. The left light guide plate 262 as the left optical image display section 28 guides the image light, which has been output from the left projection optical system 252, to the left eye LE of the user while reflecting the image light along a predetermined light path.

The receiving section 54 acts as a receiver corresponding to the transmitting section 52, and performs the serial transmission between the control device 10 and the image display section 20. The left backlight control section 202 drives the left backlight 222 based on the control signal input to the left backlight control section 202. The left LCD control section 212 drives the left LCD 242 based on the clock signal PCLK, the vertical sync signal VSync, the horizontal sync signal HSync, and the left-eye image data Data input via the receiving section 54.

It should be noted that the right backlight control section 201, the right LCD control section 211, the right backlight 221, and the right LCD 241 are also referred to collectively as a right "image light generation section." Similarly, the left backlight control section 202, the left LCD control section 212, the left backlight 222, and the left LCD 242 are also referred to collectively as a left "image light generation section." Further, the left projection optical system 252 and the left light guide plate 262 are also referred to collectively as a "left light guide section," and the right projection optical system 251 and the right light guide plate 261 are also referred to collectively as a "right light guide section." The configuration of the right light guide section and the left light guide section is not limited to the example described above, but an arbitrary method can be used as long as the virtual images are formed in front of the eyes of the user using the image light, and it is also possible to use, for example, a diffraction grating or a semi-transmissive reflecting film.

Figure 3A:
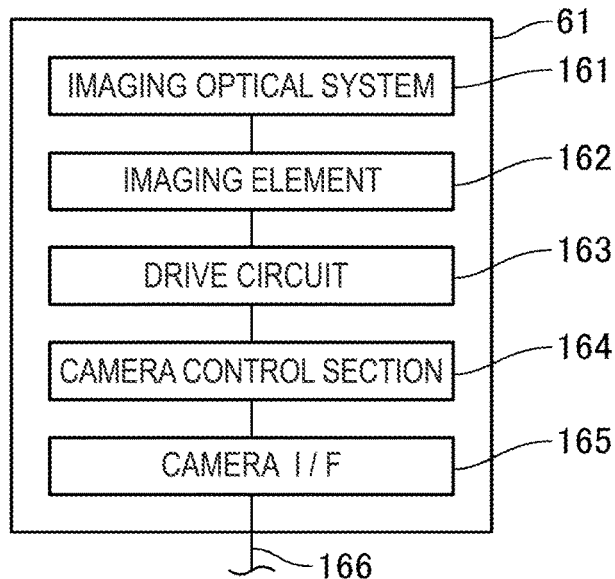
FIGS. 3A and 3B are diagrams each showing a configuration example of an imaging section.
Figure 3B:
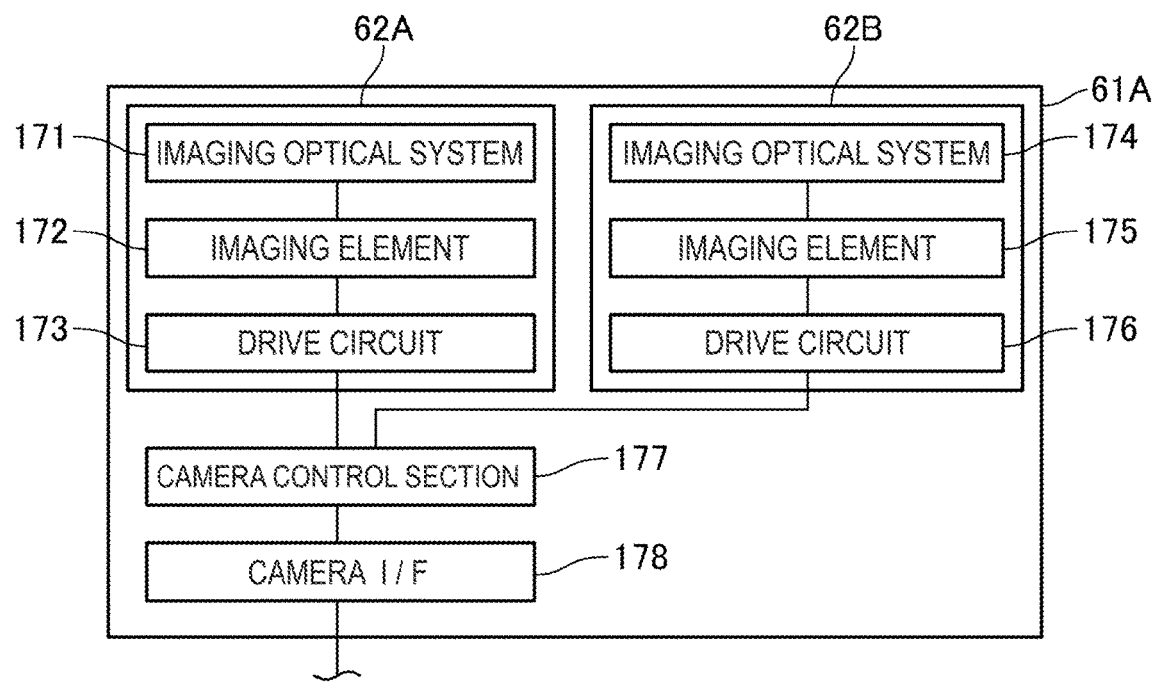

FIGS. 3A and 3B are each a block diagram showing a configuration example of the camera 61 in detail.

FIG. 3A shows a configuration of the camera 61 of the present embodiment, and FIG. 3B shows a configuration of a camera 61A as a modified example.

As shown in FIG. 3A, the camera 61 is provided with an imaging optical system 161, an imaging element 162, a drive circuit 163, a camera control section 164, and a camera interface (I/F) 165.

The imaging element 162 is an imaging element formed of CCD, CMOS, or the like. The imaging optical system 161 is an imaging lens or an imaging lens group including a plurality of lenses for guiding the outside light to the imaging element, and can also be provided with an optical element such as a prism in addition to the lens.

Further, camera I/F 165 is connected to the interface 25 via a bus 166. The bus 166 is connected to the connection section 40 by the interface 25, and is further connected to the control section 140 via the connection section 40. Therefore, the camera 61 is connected to the control section 140 via the bus 166, the interface 25, and the connection section 40. The whole including the bus 166, the interface 25, and the connection section 40 can be referred to as a bus through which the camera 61 and the control section 140 transmit and receive the data. Further, it is also possible to dispose a dedicated bus for connecting the camera I/F 165 and the control section 140 to each other between the control device 10 and the image display section 20.

Further, the camera I/F 165 can also have a configuration of being connected to the control section 140 via a wireless communication interface. There can be cited a configuration in which, for example, the interface 25 functions as the wireless communication interface, and the connection section 40 is replaced with a wireless data communication line. In this case, the wireless data communication line connecting the interface 25 and the control section 140 to each other functions as the bus described above.

The drive circuit 163 is a circuit for driving the imaging element 162. Specifically, the drive circuit 163 supplies the imaging element 162 with the drive voltage, and then reads out the signals from the imaging element 162 after the imaging element 162 receives light. The drive circuit 163 reads out the signals from the imaging element 162, and then outputs the signals to the camera control section 164.

The camera control section 164 outputs a control signal to the drive circuit 163 to control the operation in which the drive circuit 163 applies a drive voltage to the imaging element 162 and then reads out the signals from the imaging element 162. Further, the camera control section 164 generates serial data (hereinafter referred to as taken image data) of the taken image based on the signals, which are read out from the imaging element 162 and then output to the camera control section 164 by the drive circuit 163. The camera control section 164 outputs the taken image data thus generated from the camera I/F 165 to the control section 140.

The imaging resolution of the camera 61 is variable, and in the description of the present embodiment, there is described an example of performing imaging with a plurality of levels of imaging resolution. The imaging resolution of the camera 61 is set to the camera control section 164 due to the control by the control section 140.

Since it is generally difficult to vary the number of elements for receiving light in CCD, CMOS, or the like, the predetermined number of elements provided to the imaging element 162 receive the light, and then the drive circuit 163 reads out the signals corresponding to the number of elements receiving the light.

Here, due to the operation of the drive circuit 163, the camera control section 164, or the drive circuit 163 and the camera control section 164, the taken image data having the imaging resolution thus set is generated.

In a first configuration, the camera control section 164 performs a process of thinning the signals based on the resolution thus set and the number of imaging elements of the imaging element 162 in a process of quantizing the signals output by the drive circuit 163 to generate the taken image data.

In a second configuration, the camera control section 164 performs setting for making the drive circuit 163 operate in accordance with the imaging resolution set by the control section 140. The drive circuit 163 performs thinning of the signals in accordance with the control signal input from the camera control section 164, and then outputs the signals, which have been read out from the imaging element 162, to the camera control section 164 after thinning the signals.

Although the first or the second configuration described above is illustrative only, the camera 61 outputs the taken image data corresponding to the imaging resolution set by the control section 140 to the control section 140 using these configurations.

Further, by controlling the drive circuit 163, the camera control section 164 can change the frame rate of the taken image data. By making the drive circuit 163 operate with the period corresponding to the frame rate set by the control section 140, the camera control section 164 can obtain the signals corresponding to the taken image data at the frame rate thus set. The frame rate, which can be set to the camera control section 164, is arbitrary, and in the present embodiment, it is assumed that a plurality of frame rates can be set in a stepwise manner.

The imaging element 162, the drive circuit 163, the camera control section 164, and the camera I/F 165 provided to the camera 61 can be configured as substrates independent of each other or devices independent of each other, or two or more of these functional sections can integrally be configured as SoC (system on chip). The specific implementation is not particularly limited. At least the camera 61 is configured with hardware separated from the control section 140, and transmits the taken image data to the control section 140 via a wired or wireless data communication channel (bus).

The camera 61A shown in FIG. 3B as an example is provided with a first imaging section 62A and a second imaging section 62B. The first imaging section 62A is provided with an imaging optical system 171, an imaging element 172, and a drive circuit 173. Further, the second imaging section 62B is provided with an imaging optical system 174, an imaging element 175, and a drive circuit 176.

The imaging optical systems 171, 174 are each formed of a lens or a lens group similarly to the imaging optical system 161. The imaging elements 172, 175 are each an imaging element formed of CCD, CMOS, or the like similarly to the imaging element 162. Further, the drive circuits 173, 176 are circuits for driving the imaging elements 172, 175, respectively. Specifically, the drive circuits 173, 176 supply the imaging elements 172, 175 with the drive voltages, and then read out the signals from the imaging elements 172, 175 after the imaging elements 172, 175 receive light, respectively.

The drive circuit 173 reads out the signal from the imaging element 172, and then outputs the signal to the camera control section 177. Further, the drive circuit 176 reads out the signal from the imaging element 175, and then outputs the signal to the camera control section 177.

The camera I/F 178 connects the camera 61A to the control section 140 similarly to the camera I/F 165.

The camera control section 177 generates the taken image data based on the signals input from the drive circuits 173, 176, and then outputs the taken image data to the control section 140 via the camera I/F 178 similarly to the camera control section 164.

The camera 61A performs imaging while switching between the first imaging section 62A and the second imaging section 62B. The first imaging section 62A and the second imaging section 62B correspond to respective imaging resolutions different from each other. Therefore, by switching between the first imaging section 62A and the second imaging section 62B, imaging with different imaging resolution can be performed.

Switching between the first imaging section 62A and the second imaging section 62B is performed by the camera control section 177 in accordance with the control by the control section 140. The camera control section 177 outputs the control signals respectively to the drive circuits 173, 176 to thereby activate either one of the first imaging section 62A and the second imaging section 62B to perform imaging. It is also possible to adopt a configuration in which the first imaging section 62A and the second imaging section 62B become in the power-saving state except when performing imaging.

As described above, the signal output by the drive circuit 173 and the signal output by the drive circuit 176 are the signals output by the imaging elements different in resolution (the number of elements). Therefore, the camera control section 177 can generate the taken image data with different imaging resolution using the process of converting the signals output by the drive circuits 173, 176 into the taken image data.

Further, similarly to the camera control section 164, by controlling the drive circuits 173, 176, the camera control section 177 can change the frame rate of the taken image data.

The camera 61 provided to the head-mounted display device 100 according to the present embodiment is capable of performing imaging while switching between the plurality of imaging resolutions to output the taken image data as explained with reference to FIG. 3A. Further, in the case of replacing the camera 61 with the camera 61A shown in FIG. 3B, imaging can be performed while switching between at least two levels of imaging resolution.

The camera 61 shown in FIG. 3A has a simple configuration, and has an advantage that the camera 61 can easily be miniaturized. Further, the camera 61A shown in FIG. 3B has advantages that the process of the camera control section 177 switching the imaging resolution is simple, and that the first imaging section 62A and the second imaging section 62B are each required only to correspond to a single imaging resolution, and therefore, the imaging element or the like having a simple configuration can be used.

It is also possible for the camera 61A shown in FIG. 3B to have a configuration in which the first imaging section 62A and the second imaging section 62B have the same imaging resolution. In this case, the first imaging section 62A and the second imaging section 62B are different in layout position from each other, and are disposed so that the imaging range (field angle) of the first imaging section 62A and the imaging range of the second imaging section 62B are different from each other. In this configuration, it is possible to adopt a usage of switching between the first imaging section 62A and the second imaging section 62B in accordance with the location to be imaged. Further, it is also possible to adopt a usage of performing imaging with both of the first imaging section 62A and the second imaging section 62B, and then performing image processing of combining the taken images to thereby obtain the taken image of a broader imaging range. Further, it is also possible to use a camera provided with three or more imaging sections each corresponding to the first imaging section 62A or the second imaging section 62B instead of the camera 61 or the camera 61A. In this case, the imaging resolutions of the respective imaging sections can be different from each other or equal to each other as is explained with respect to the first imaging section 62A and the second imaging section 62B.

FIGS. 4A through 4C are diagrams showing a configuration of condition tables 121, 122, and 123 stored in the storage section 120 with respect to the operation mode of the head-mounted display device 100. FIG. 4A shows a configuration example of the condition table 121, FIG. 4B shows a configuration example of the condition table 122, and FIG. 4C shows a configuration example of the condition table 123.

In the present embodiment, there is described a configuration capable of switching the imaging resolution of the camera 61 in two levels as an example. The two levels of the resolution are referred to as high resolution and low resolution, respectively. Further, in the present embodiment, there is described a configuration capable of switching the frame rate of the taken image data output by the camera 61 in two levels as an example. The two levels of the frame rate are referred to as a high rate and a low rate, respectively.

The condition table 121 shown in FIG. 4A defines the four operation modes of mode 1 through mode 4. The mode 1 is an operation mode in which the imaging resolution is set to the low resolution, the frame rate is set to the high rate, and the image analysis section 182 does not perform the marker recognition. The mode 1 can be called a low resolution mode. The mode 2 is an operation mode in which the imaging resolution is set to the high resolution, the frame rate is set to the low rate, and the image analysis section 182 does not perform the marker recognition, and can be called a high resolution mode.

The mode 3 is an operation mode in which the imaging resolution is set to the low resolution, the frame rate is set to the low rate, and the image analysis section 182 performs the marker recognition, and can be called a low resolution marker recognition mode. The mode 4 is an operation mode in which the imaging resolution is set to the high resolution, the frame rate is set to the high rate, and the image analysis section 182 performs the marker recognition, and can be called a high resolution marker recognition mode.

The display processing section 185 switches the operation mode of the camera 61, the imaging control section 181, the image analysis section 182, and the display processing section 185 to either of the mode 1 through the mode 4 in accordance with the operation of the head-mounted display device 100.

Further, it is also possible for the display processing section 185 to automatically switch the plurality of operation modes and then perform the operation mode. The operation mode is set to, for example, the condition table 122 shown in FIG. 4B.

In the condition table 122, there are set two operation modes of mode 5 and mode 6. The mode 5 is an operation mode of periodically switching between the mode 1 and the mode 2. Further, the mode 6 is an operation mode of periodically switching between the mode 3 and the mode 4. It can also be said that in the mode 5, the mode 1 and the mode 2 are performed intermittently, and it can also be said that in the mode 6, the mode 3 and the mode 4 are performed intermittently.

Further, in the mode 5 and the mode 6, it is also possible to change apart of the condition of the mode 1 through the mode 4, and for example, in the mode 5 and the mode 6, the frame rate of the taken image data can be fixed to the low rate.

Further, it is also possible for the display processing section 185 to perform an operation of displaying the taken image data of the camera 61 using the image display section 20, and this operation is different from those of the mode 1 through the mode 6. The mode of this operation is shown in FIG. 4C as mode 10. FIG. 4C shows an example of the condition table 123 for setting the operation condition of the mode 10. The mode 10 is an operation mode in which the imaging resolution is set to the low resolution, the frame rate is set to the low rate, the image analysis section 182 does not perform the marker recognition, and the taken image data is displayed by the image display section 20, and can be called a taken image display mode.

The mode 1 through the mode 6, and the mode 10 designate the imaging resolution and the frame rate, and therefore include the imaging condition according to the invention.

It is possible for the storage section 120 to store all of the condition tables 121, 122, and 123 shown in FIGS. 4A through 4C, or it is also possible to adopt a configuration in which the storage section 120 stores either of the tables alone. In the description of the present embodiment, there is explained the configuration in which the storage section 120 stores the condition tables 121, 122, and 123.

The display processing section 185 selects either of the mode 1 through the mode 6, and the mode 10 to perform switching, and then sets the imaging resolution and the frame rate of the mode thus selected to the imaging control section 181 and the camera 61. Further, the display processing section 185 sets whether or not the marker recognition is performed in the image analysis section 182 in accordance with the setting of the operation mode thus selected.

Figure 5:
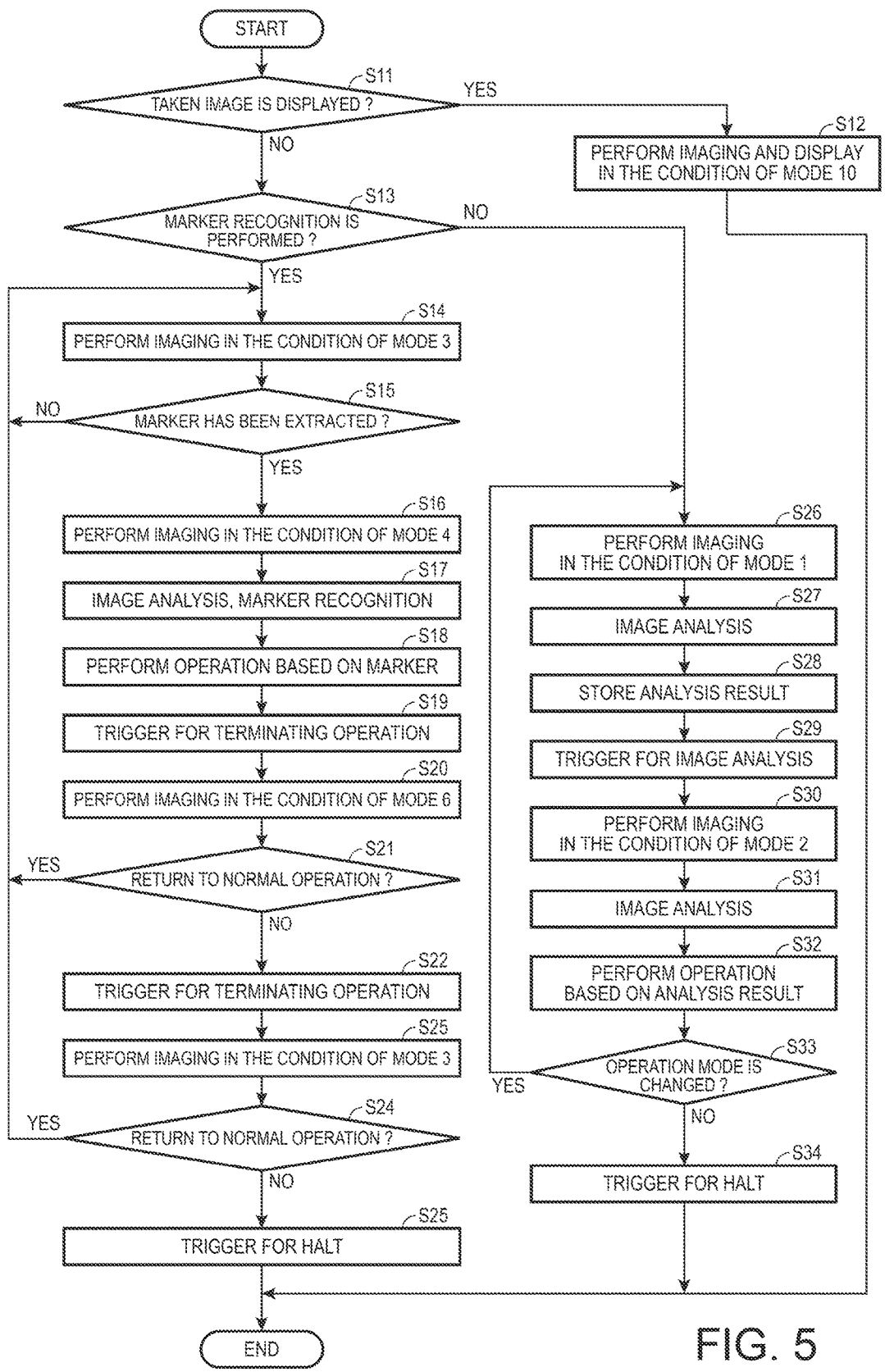
FIG. 5 is a flowchart showing an operation of the head-mounted display device.

FIG. 5 is a flowchart showing the operation of the head-mounted display device 100, and in particular, showing the operation related to the setting of the imaging resolution and the frame rate.

The control section 140 determines (step S11) whether or not the head-mounted display device 100 performs the process of displaying the taken image data of the camera 61 based on the instruction input by an operation of the operation section 111, the external equipment, or the like.

In the case of displaying the taken image data (YES in the step S11), the control section 140 selects the mode 10 set in the condition table 123 as the operation mode of the head-mounted display device 100 to perform (step S12) the process. Specifically, the control section 140 sets the imaging resolution, the frame rate, and whether or not the marker recognition is performed in the mode 10 in accordance with the condition table 123, and then operates. Subsequently, the control section 140 terminates the present process in the case in which, for example, a termination condition is fulfilled. The termination condition is, for example, a condition in which the termination of the present process is instructed using the operation section 111, a condition in which a state in which the operation section 111 is not operated lasts for a predetermined time, or a condition in which a state in which the nine-axis sensor 66 does not detect a motion of the image display section 20 lasts for a predetermined time.

In the case in which the taken image data is not displayed (NO in the step S11), the control section 140 determines (step S13) whether or not the marker recognition is performed. For example, in the case in which the marker recognition is instructed by the operation of the operation section 111, or the case in which an application program, which is currently running on the operating system 150, executes a marker recognition function, it is determined that the marker recognition is performed.

In the case of performing the marker recognition (YES in the step S13), the control section 140 selects the mode 3 in the condition table 121, and then makes the camera 61 perform (step S14) imaging. The control section 140 analyzes the taken image data of the camera 61 to determine (step S15) whether or not the marker has been successfully detected from the taken image data.

Figure 6A:
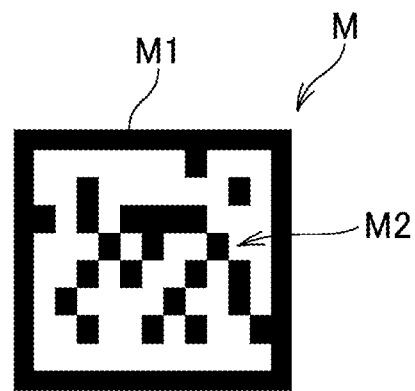
FIGS. 6A through 6C are explanatory diagrams of the operation related to reading of a marker.
Figure 6B:
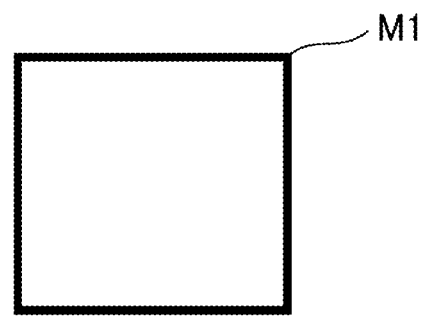
Figure 6C:
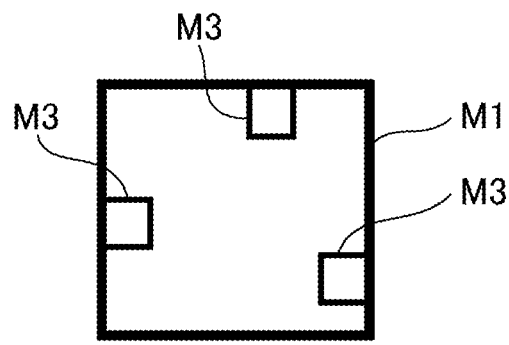

FIGS. 6A through 6C are explanatory diagrams of the operation of the head-mounted display device 100 related to reading of the marker, and show a process of the control section 140 recognizing the marker.

FIG. 6A shows a two-dimensional barcode as an example of the marker to be the reading target. FIGS. 6B and 6C show an example of a reading method.

Most of the markers, which can mechanically be read using an image, include a feature representing the fact that the object is a marker, and a symbol expressing data. The marker M shown in FIG. 6A as an example has a roughly square frame M1 as a feature, and has a symbol M2 representing data with a predetermined format disposed inside the frame M1.

The image analysis section 182 analyzes the taken image data of the camera 61 to firstly detect the frame M1 as the feature of the marker M from the taken image data to obtain the position and so on of the frame M1 in the taken image data. In this process, since it is sufficient to process the frame M1 as shown in FIG. 6B, the resolution of the taken image data can be low. In the case of processing the taken image data low in resolution, the processing load of the image analysis section 182 is reduced.

Further, it is also possible for the image analysis section 182 to detect the frame M1 as the feature of the marker M, and symbols M3 located at positions, which have previously been set with reference to the frame M1, from the taken image data of the camera 61. In other words, it is also possible to perform reading with respect to some of the symbols M3, and in this case, it is possible to reduce false detection compared to the case of detecting the frame M1 alone. In this process, it is sufficient to process the frame M1 and some of the symbols M3 as shown in FIG. 6C, and in the case in which the detection positions of the symbols M3 are distantly located, it is also possible for the taken image data to be low in resolution. In the case of processing the taken image data low in resolution, the processing load of the image analysis section 182 is reduced.

In the step S14, the image analysis section 182 detects the frame M1 and the symbols M3 as shown in FIGS. 6B and 6C. Subsequently, the control section 140 detects the entire marker as shown in FIG. 6A to read the data represented by all of the symbols based on the taken image data higher in resolution.

Specifically, the control section 140 sets the condition of the mode 4 high in the imaging resolution, then makes the camera 61 perform (step S16 shown in FIG. 5) imaging, and then recognizes (step S17) the marker from the taken image data.

Since the control section 140 first performs imaging in the condition of the mode 3 to detect the feature of the marker, and then reads the marker in the mode 4, the power consumption of the head-mounted display device 100 can be suppressed. That is, if imaging is continued in the mode 4 in the step S14 until the marker is detected, since the imaging is performed with high resolution, and the taken image data high in resolution is transmitted to the control section 140 via the bus, the high load state continues. In this period, since the load of the control section 140 is high, the power consumption is high, and the power consumption of the bus is also high. By using the mode 3 as in the present embodiment, the power consumption of the control section 140 and the bus for transmitting the taken image data can be suppressed. Further, in the step S17, since the analysis is performed in the state in which the feature of the marker has not been detected yet, the target of the analysis is set to the entire taken image data, and there is a possibility that the processing load increases. In contrast, in the present embodiment, the processing load can be reduced by using the feature of the marker having been detected based on the taken image data low in resolution.

Further, in the head-mounted display device 100, the user can visually recognize the range, which is imaged by the camera 61, through the dimming plates 20A. Therefore, there is no need for the image display section 20 to directly display the taken image of the camera 61. In the case of, for example, imaging the marker with the camera 61, it is sufficient for the user to visually recognize the marker through the dimming plates 20A to adjust the direction and the position of the head so that the marker is fit into the imaging range of the camera 61, and during this period, there is no need to display the taken image of the camera 61 on the image display section 20. In other words, unlike the case of imaging the marker with a portable device or the like such as a smartphone or a cellular phone, it is not required to display the taken image in order to take an image of the marker. By making use of such characteristics of the head-mounted display device 100, since there is no need to always perform imaging with high resolution in the case of recognizing the marker, according to the head-mounted display device 100, it is possible to reduce the power consumption.

The control section 140 performs (step S18) a process based on the marker recognized in the step S17. The control section 140 performs, for example, a process of converting the data read from the marker into text data to display on the image display section 20, or a process of obtaining the content designated by the data read therefrom from the storage section 120 or the external equipment OA to play to display. In this process, for example, an image or characters are displayed so that the image and the characters are visually recognized so as to be superimposed on the outside view visually recognized by the user through the dimming plates 20A to thereby achieve augmented reality (AR).

Subsequently, when the control section 140 has detected (step S19) a trigger for the termination of the operation, the control section 140 sets the condition of the mode 6, and then performs (step S20) imaging by the camera 61. As the trigger for the termination of the operation, there can be cited, for example, an event that the termination of the operation of the step S18 is instructed using the operation section 111, an event that the duration of the state in which the operation section 111 is not operated reaches a predetermined time, and an event that the duration of the state in which the nine-axis sensor 66 does not detect a motion of the image display section 20 reaches a predetermined time. The trigger detected in the step S19 can be said to be a trigger for a transition to a so-called sleep state.

Further, after the transition to the mode 6, the control section 140 determines (step S21) whether or not a trigger for returning to a normal operation has been detected. As the trigger for returning to the normal operation, there can be cited, for example, an operation of the operation section 111, and detection of a motion of the image display section 20 by the nine-axis sensor 66. In the case in which the trigger for returning to the normal operation has been detected (YES in the step S21), the control section 140 returns the process to the step S14.

In the case in which the trigger for returning to the normal operation has not been detected (NO in the step S21), the control section 140 waits (step S22) until the trigger for the termination of the operation is detected, and then sets (step S23) the condition of the mode 3 to perform imaging with the camera 61 when the trigger for the termination of the operation is detected. The trigger for the termination of the operation in the step S22 can be said to be a trigger for transition from the sleep state to a deeper sleep state. There can be cited, for example, an event that the transition to the deeper sleep state is instructed by the operation section 111, and an event that the duration of the state in which the operation section 111 is not operated, or the state in which the nine-axis sensor 66 does not detect a motion of the image display section 20 reaches a predetermined time longer than that of the trigger in the step S19.

Subsequently, the control section 140 determines (step S24) whether or not the trigger for returning to the normal operation has been detected similarly to the step S21. In the case in which the trigger for returning has been detected (YES in the step S24), the control section 140 returns the process to the step S14. In the case in which the trigger for retuning has not been detected (NO in the step S24), the control section 140 waits (step S25) until a trigger for a halt is detected, and then terminates the present process when the trigger for a halt is detected.

In the case in which the control section 140 does not perform the marker recognition (NO in the step S13), the control section 140 selects the mode 1, and then makes the camera 61 perform (step S26) imaging. The control section 140 analyzes (step S27) the taken image data of the camera 61 and then temporarily stores (step S28) the analysis result in the RAM (not shown) or the storage section 120. Then, the control section 140 waits until a trigger for starting the image analysis is detected, and then selects the mode 2 to perform (step S30) imaging with the camera 61 in the condition of the mode 2 in the case in which the trigger is detected (step S29). As the trigger for starting the image analysis, there can be cited, for example, an operation of the operation section 111, and an event of detecting a vibration with a predetermined pattern by the vibration sensor 65.

The control section 140 analyzes (step S31) the taken image of the step S30 to perform (step S32) an operation based on the result of the image analysis. The operation performed in the step S32 is, for example, an operation of displaying information such as an image or a text with the image display section 20. This operation is a so-called work support operation for providing information related to the work in the case in which the user wearing the head-mounted display device 100 performs the work. There can be cited an operation of detecting an image of an object (e.g., a processing target) of the work from the taken image data high in resolution shot in the step S30 to display the information related to the object, and so on. On this occasion, the control section 140 performs detection of a candidate of the object of the work from the taken image data low in resolution in the step S26. Further, in the case in which the object or the candidate having a feature similar to the object has been detected by the analysis in the step S27, the detection position is stored in the step S28. The control section 140 performs the detection of the object at a position corresponding to the position thus stored from the taken image data high in resolution of the step S30.

In the operation of the steps S26 through S31, similarly to the marker recognition explained with reference to FIGS. 6A through 6C, the taken image data low in resolution is analyzed first, and then the taken image data higher in resolution is analyzed based on the analysis result. Therefore, the power consumption of the camera 61, the control section 140, and the bus connecting the camera 61 and the control section 140 to each other can be suppressed. Further, in the step S27, since the analysis is performed in the state in which the candidate of the object has not been detected yet, the target of the analysis is set to the entire taken image data, and the processing load is high. However, in the present embodiment, by using the taken image data low in resolution, the processing load can be reduced.

Subsequently, the control section 140 determines (step S33) whether or not an instruction of changing the operation mode has been input by the operation section 111 or the vibration sensor 65, and then returns the process to the step S26 in the case in which the instruction has been input, or waits until the trigger for a halt is detected in the case in which the instruction has not been input. Then, the control section 140 terminates the present process after detecting (step S34) the trigger for a halt. The trigger for a halt is an input of the halt instruction by the operation section 111 similarly to the step S25.

The control section 140 can also return the process to the step S11 to perform a loop operation in the case in which the trigger for a halt has not been detected in the steps S25 and S34. Further, the control section 140 can also return the process to the step S11 to perform a loop operation after performing the operation in the mode 10 set in the condition table 123 in the step S12.

As explained hereinabove, the head-mounted display device 100 according to the embodiment to which the invention is applied is provided with the image display section 20 for displaying an image so as to be able to be visually recognized together with the outside view, the camera 61, and the control section 140 for processing the taken image data of the camera 61, wherein the control section 140 selects the mode having the processing condition corresponding to whether or not display of the taken image data is performed in the image display section 20, and then processes the taken image data. For example, the control section 140 processes the taken image data in accordance with the processing condition different by whether or not the taken image data is displayed in the image display section 20. Thus, it is possible to optimize the processing condition to suppress the processing load.

Further, since the imaging range of the camera 61 is a range corresponding to the outside view visually recognized through the image display section 20, an appropriate processing condition can be set even in the case of performing display on the image display section 20 based on the taken image data, or in the case in which there is no need to make the image display section 20 perform display.

Further, the control section 140 processes the taken image data in accordance with the processing condition different by whether or not the taken image data is displayed in the image display section 20. Therefore, the taken image data can efficiently be processed in an appropriate condition.

Further, the control section 140 selects the modes including the mode in the case of performing display based on the taken image data with the image display section 20, and the mode in the case of not being accompanied by display based on the taken image data with the image display section 20. Therefore, an appropriate processing condition can be set irrespective of the state, and therefore, it is possible to realize a good display quality, and to suppress the processing load.

Further, the control section 140 is provided with the imaging control section 181 for setting the imaging condition of the camera 61, and making the camera 61 perform imaging in the imaging condition thus set, and the control section 140 makes the imaging control section 181 set the imaging condition corresponding to the processing condition. Thus, it is possible to appropriately set the imaging condition of the camera 61 to thereby suppress the processing load.

The camera 61 and the control section 140 are connected to each other with the bus, and the camera 61 transmits the taken image data, which is suitable for the imaging condition set by the imaging control section, to the control section 140 via the bus. In this case, the processing load related to the transmission of the data can be reduced.

Further, the camera 61 is configured so as to take a moving image to output the taken image data, and is capable of performing the operation while switching between the operation modes related to at least either of the resolution and the frame rate of the taken image data. Since the imaging control section 181 sets the operation mode in which the camera 61 performs the operation, by switching the operation mode of the camera 61, it is possible to easily change the condition, and it is possible to set a necessary and sufficient processing condition to thereby suppress the processing load.

Further, the control section 140 can change the execution state of the process, and the camera 61 can perform the operation while switching between the operation modes corresponding to the execution state of the process of the control section 140. The imaging control section 181 sets the operation mode, which corresponds to the execution state of the process of the control section 140, to the camera 61. By switching the operation mode of the camera 61 in accordance with the execution state of the process with respect to the taken image data in such a manner as described above, it is possible to make the camera 61 perform the operation in an appropriate condition to thereby efficiently perform imaging and the process.

Since the operation mode of the camera 61 includes two or more operation modes corresponding to whether or not the control section 140 performs the marker recognition using the taken image data, it is possible to appropriately set the condition of the process to thereby suppress the processing load.

Further, the processing condition in the case of performing display based on the taken image data with the image display section 20 includes a condition of setting the capacity of the taken image data input to the control section 140 smaller than that in the case of not being accompanied by display based on the taken image data with the image display section 20. Thus, by decreasing the capacity of the taken image data to be processed, the processing load can efficiently be suppressed.

Further, in the head-mounted display device 100, since the power supply section 130 provided with a battery supplies the power to at least the camera 61 and the control section 140, the power consumption can be suppressed by reducing the load of the camera 61 and the control section 140, and thus, it is possible to suppress battery consumption.

It should be noted that the invention is not limited to the configuration of the embodiment described above, but can be implemented in various forms within the scope or the spirit of the invention.

For example, although in the embodiment described above, there is adopted a configuration in which the control section 140 selects the mode 1 through the mode 6, and the mode 10 shown in FIGS. 4A through 4C, the modes are illustrative only. For example, although in the mode 2, the imaging resolution is higher, but the frame rate is lower compared to the mode 1, this is one of the methods of avoiding the restriction of the capacity of the bus for connecting the camera 61 and the control section 140 to each other. In the case in which the capacity of the bus described above is sufficiently high, it is also possible to set the frame rate in the mode 2 to be roughly equal to that in the mode 1. Further, the type of the marker detected by the control section 140 in the steps S14 through S18 can also be set in advance, and in this case, the load of the process of detecting and then recognizing the feature of the marker in the step S17 can further be reduced to achieve high-speed processing.

Further, it is also possible for the camera 61 to be a camera for outputting monochrome taken image data, or a camera for outputting color taken image data. In the case of outputting the color taken image data, which one of the color taken image data, the monochrome taken image data, and the grayscale taken image data is used can be set using the condition tables 121, 122, and 123. In the case of, for example, detecting a monochrome marker, by setting the monochrome image data as the imaging condition, the amount of the data can further be reduced. Further, in the case of performing imaging with high resolution for the work support (e.g., the step S30), by outputting the color taken image data, there is an advantage that a more exact work support can be performed.

Further, it is also possible for the camera 61 to be an infrared camera for receiving an infrared ray to take an image, or a ultraviolet camera for receiving a ultraviolet ray to take an image. In this case, imaging can be performed under the condition in which the intensity of the visible light is low, and specifically, imaging can be performed even in the dark. Further, in the case in which the camera 61 is the infrared camera, it becomes also possible to perform measurement of an amount of heat radiation.

Further, for example, it is possible to adopt an image display section of a different type such as an image display section to be worn like a cap instead of the image display section 20, and it is sufficient to be provided with a display section for displaying an image so as to correspond to the left eye of the user, and a display section for displaying an image so as to correspond to the right eye of the user.

Further, although in the embodiment described above, the explanation is presented citing the configuration in which the image display section 20 and the control device 10 are separated from each other, and are connected to each other via the connection section 40 as an example, it is also possible to adopt a configuration in which the control device 10 and the image display section 20 are configured integrally to be mounted on the head of the user.

Further, a laptop computer, a tablet computer, or a desktop computer can also be used as the control device 10. Further, as the control device 10, there can be used a portable electronic apparatus including a game machine, a cellular phone, a smartphone, and a portable media player, and other dedicated equipment. Further, it is also possible to adopt a configuration in which the control device 10 is configured separately from the image display section 20, and the variety of signals are wirelessly transmitted and received between the control device 10 and the image display section 20. In this case, it is also possible to dispose the power supply section 130 in each of the control device 10 and the image display section 20.

Further, for example, as the configuration of generating the image light in the image display section 20, it is also possible to adopt a configuration including an organic EL (organic electroluminescence) display and an organic EL control section. Further, as the configuration of generating the image light, a LCOS (Liquid Crystal On Silicon; LCoS is a registered trademark), a digital micromirror device, and so on can be used.

Further, as the optical system for guiding the image light to the eyes of the user, there can be adopted a configuration in which an optical member for transmitting the outside light entering from the outside toward the device, and the outside light is made to enter the eyes of the user together with the image light. Further, it is also possible to use an optical member located in front of the eyes of the user to overlap a part or the whole of the field of view of the user. Further, it is also possible to adopt a scanning type optical system for causing a scanning movement of the laser beam or the like to form the image light. Further, the invention is not limited to those guiding the image light inside the optical member, but those only provided with a function of guiding the image light by refracting and/or reflecting the image light toward the eyes of the user can also be adopted.

For example, it is also possible to apply the invention to a laser retinal projection head-mounted display. Specifically, it is also possible to adopt a configuration in which the light emitting section is provided with a laser source and an optical system for guiding the laser beam to the eyes of the user, makes the laser beam enter the eyes of the user, and then scans the surface of the retina with the laser beam to provide an image on the retina to thereby make the user visually recognize the image.

Further, it is also possible to apply the invention to a display device, which adopts the scanning optical system using an MEMS mirror, and uses the MEMS display technology. In other words, as the light emitting section, it is also possible to provide a signal light forming section, a scanning optical system having the MEMS mirror for causing the scanning movement of the light emitted by the signal light forming section, and an optical member on which a virtual image is formed by the light, the scanning movement of which is caused by the scanning optical system. In this configuration, the light emitted by the signal light forming section is reflected by the MEMS mirror, enters the optical member, and is guided through the optical member, and then reaches a virtual image forming surface. By the MEMS mirror causing the scanning movement of the light, the virtual image is formed on the virtual image forming surface, and by the user figuring out the virtual image with the eyes, the image is recognized. An optical component used in this case can be a component for guiding the light through a plurality of times of reflection similarly to, for example, the right light guide plate 261 and the left light guide plate 262 in the embodiment described above, or can be realized using a half-mirror surface.

Further, the optical elements according to the invention is not limited to the right light guide plate 261 and the left light guide plate 262 respectively including the half mirrors 261A, 262A, but can sufficiently be the optical components for making the image light enter the eyes of the user, and specifically, a diffraction grating, a prism, and a holography display section can also be used.

Further, at least a part of the functional blocks shown in FIG. 2 can be realized with hardware, or can be provided with a configuration realized by cooperation between hardware and software, and the invention is not limited to the configuration of arranging the independent hardware resources in the same manner as shown in FIG. 2. Further, a program executed by the control section 140 can be stored in the storage section 120 or a storage device inside the control device 10, or it is also possible to adopt a configuration of obtaining the program stored in an external device via the communication section 117 or the interface 125 to execute the program. Further, among the constituents formed in the control device 10, the operation section 111 alone can also be formed as a single user interface (UI). Further, the constituents formed in the control device 10 can also be formed in the image display section 20 in an overlapping manner. For example, the control section 140 shown in FIG. 2 can also be provided to both of the control device 10 and the image display section 20, and it is also possible to adopt a configuration in which the functions respectively performed by the control section 140 provided to the control device 10 and the CPU provided to the image display section 20 are separated from each other.

The entire disclosure of Japanese Patent Application No. 2014-261728, filed Dec. 25, 2014 is expressly incorporated by reference herein.

What is claimed is:

1. A display device comprising:
   a display section adapted to display an image so as to be able to be visually recognized together with an outside view;
   an imaging section;
   an imaging control section that sets an imaging condition to the imaging section; and
   a processing section adapted to process taken image data of the imaging section,
   wherein the processing section processes the taken image data in accordance with a processing condition that is determined based on whether the taken image data is currently displayed in the display section,
   wherein the processing section instructs the imaging control section to set, to the imaging section, the imaging condition that corresponds to the processing condition, and
   wherein, when the taken image data is currently displayed in the display section, the processing condition comprises setting a capacity of the taken image data input to the processing section smaller than a capacity of the taken image data input into the processing section when the taken image data is not currently displayed in the display section.

2. The display device according to claim 1, wherein
   the processing section is configured so as to be able to perform a process of displaying the taken image data in the display section, and perform image processing on the taken image data, and
   the imaging control section sets the imaging condition, which corresponds to the process performed by the processing section, to the imaging section.

3. The display device according to claim 1, wherein
   the imaging section and the processing section are connected to each other with a bus, and
   the imaging section transmits the taken image data, which is suitable for the imaging condition set by the imaging control section, to the processing section via the bus.

4. The display device according to claim 1, wherein
   the imaging section is capable of performing an operation while switching between operation modes related to at least either of a resolution and a frame rate of the taken image data, and
   the imaging control section sets the operation mode in which the imaging section performs the operation.

5. The display device according to claim 4, wherein
   the processing section is capable of changing an execution state of a process,
   the imaging section is capable of performing an operation while switching between operation modes corresponding to the execution state of the process of the processing section, and
   the imaging control section sets the operation mode, which corresponds to the execution state of the process of the processing section, to the imaging section.

6. The display device according to claim 4, wherein
   the operation mode of the imaging section includes operation modes corresponding to whether or not the processing section performs marker recognition using the taken image data.

7. The display device according to claim 1, wherein
   an imaging range of the imaging section is a range corresponding to the outside view to be visually recognized through the display section.

8. The display device according to claim 1, further comprising:
   a battery,
   wherein power is supplied from the battery to at least the imaging section and the processing section.

9. A method of controlling a display device, comprising:
   controlling a display device having a display section adapted to display an image taken by an imaging section such that the taken image is visually recognizable together with an outside view;
   processing taken image data in accordance with a processing condition that is determined based on whether the taken image data is currently displayed in the display section; and
   setting, to the imaging section, the imaging condition that corresponds to the processing condition,
   wherein, when the taken image data is currently displayed in the display section, the processing of the taken image data according to the processing condition comprises setting a capacity of the taken image data input for processing smaller than a capacity of the taken image data input for processing when the taken image data is not currently displayed in the display section.

\* \* \* \* \*